(12) United States Patent
Nam et al.

(10) Patent No.: US 12,009,152 B2
(45) Date of Patent: *Jun. 11, 2024

(54) MULTILAYER CAPACITOR

(71) Applicant: SAMSUNG ELECTRO-MECHANICS CO., LTD., Suwon-si (KR)

(72) Inventors: Hong Gi Nam, Suwon-si (KR); Seung In Baik, Suwon-si (KR); Ji Su Hong, Suwon-si (KR); Eun Ha Jang, Suwon-si (KR); Hee Sun Chun, Suwon-si (KR); Jae Sung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,331

(22) Filed: Apr. 17, 2023

(65) Prior Publication Data

US 2023/0253153 A1  Aug. 10, 2023

Related U.S. Application Data

(63) Continuation of application No. 17/339,443, filed on Jun. 4, 2021, now Pat. No. 11,657,971.

(30) Foreign Application Priority Data

Dec. 29, 2020  (KR) .................. 10-2020-0186436

(51) Int. Cl.
*H01G 4/12* (2006.01)
*H01G 4/248* (2006.01)
*H01G 4/30* (2006.01)

(52) U.S. Cl.
CPC ........... *H01G 4/1227* (2013.01); *H01G 4/248* (2013.01); *H01G 4/30* (2013.01)

(58) Field of Classification Search
None
See application file for complete search history.

(56) References Cited

U.S. PATENT DOCUMENTS 11,657,971 B2 *  5/2023  Nam .................. H01G 4/248
                                                       361/301.4
2010/0110608 A1  5/2010  Wei et al.
(Continued)

FOREIGN PATENT DOCUMENTS

CN        112216510 A     1/2021
JP          5462962 B1    4/2014
(Continued)

OTHER PUBLICATIONS

Notice of Allowance issued in corresponding U.S. Appl. No. 17/339,443 dated Jan. 19, 2023.
(Continued)

*Primary Examiner* — Dion R. Ferguson
(74) *Attorney, Agent, or Firm* — MORGAN, LEWIS & BOCKIUS LLP

(57) ABSTRACT

A multilayer capacitor includes a body including a plurality of dielectric layers and a plurality of internal electrodes laminated in a first direction, and external electrodes. The body includes an active portion, in which the plurality of internal electrodes are disposed to form capacitance, corresponding to a region between internal electrodes disposed on an outermost side in the first direction, among the plurality of internal electrodes, a cover portion covering the active portion in the first direction, and a side margin portion covering the active portion in a second direction, perpendicular to the first direction, and $1.49<A1/A2<2.50$ where A1 is an average grain size of the dielectric layer in a central (Continued)

region of the active portion, and A2 is an average grain size of the dielectric layer in an active-cover boundary portion, adjacent to the cover portion, of the active portion.

19 Claims, 6 Drawing Sheets

(56) References Cited

U.S. PATENT DOCUMENTS

| | | | |
|---|---|---|---|
| 2012/0262840 A1* | 10/2012 | Koizumi | H01G 4/12 361/321.2 |
| 2013/0027843 A1 | 1/2013 | Seo et al. | |
| 2013/0194715 A1* | 8/2013 | Kim | H01G 4/30 156/60 |
| 2014/0022692 A1* | 1/2014 | Yoon | H01G 4/30 156/322 |
| 2014/0211367 A1 | 7/2014 | Morita et al. | |
| 2014/0301013 A1* | 10/2014 | Kim | H01G 4/01 29/25.03 |
| 2015/0348712 A1* | 12/2015 | Lee | H01G 4/30 156/89.12 |
| 2017/0169952 A1* | 6/2017 | Kato | H01G 4/2325 |
| 2021/0012968 A1* | 1/2021 | Taniguchi | H01G 4/30 |
| 2022/0139625 A1* | 5/2022 | Lee | H01G 4/012 361/301.4 |
| 2022/0208455 A1* | 6/2022 | Nam | H01G 4/232 |

FOREIGN PATENT DOCUMENTS

| | | |
|---|---|---|
| JP | 2019-204931 A | 11/2019 |
| KR | 10-2013-0012716 A | 2/2013 |
| KR | 10-1681358 B1 | 11/2016 |

OTHER PUBLICATIONS

Office Action issued in corresponding U.S. Appl. No. 17/339,443 dated Aug. 3, 2022.

* cited by examiner

I-I'

II-II'

MULTILAYER CAPACITOR

CROSS-REFERENCE TO RELATED APPLICATION(S)

The present application is the continuation application of U.S. patent application Ser. No. 17/339,443 filed Jun. 4, 2021, which claims the benefit of priority to Korean Patent Application No. 10-2020-0186436, filed on Dec. 29, 2020 in the Korean Intellectual Property Office, the entire disclosures of which are incorporated herein by reference in their entirety.

TECHNICAL FIELD

The present disclosure relates to a multilayer capacitor.

BACKGROUND

A capacitor is a device capable of storing electricity in which electricity is generally accumulated in each of two opposing electrodes when a voltage is applied thereto. When a direct current (DC) voltage is applied, current flows in the capacitor, while electricity is accumulated therein. When the accumulation is completed, no current flows. On the other hand, when an alternating current (AC) voltage is applied, AC current flows while polarities of electrodes alternate.

There may be various types of capacitors, such as an aluminum electrolytic capacitor including, depending a type of an insulating material provided between electrodes, aluminum electrodes and a thin oxide film disposed between the aluminum electrodes, a tantalum capacitor using tantalum as a material of an electrode, a ceramic capacitor using a dielectric material with a high dielectric constant, such as titanium barium, between electrodes, a multilayer ceramic capacitor (MLCC) using a ceramic material with a high dielectric constant in a multilayer structure as a dielectric material provided between electrodes, and a film capacitor using a polystyrene film as a dielectric material provided between electrodes.

Among such capacitors, a multilayer ceramic capacitor may have excellent temperature properties and frequency properties and may have a small size, such that a multilayer ceramic capacitor has been increasingly used in devices in a variety of fields, such as a radio-frequency (RF) circuit. Recently, there have been continuous attempts to implement a small-sized multilayer ceramic capacitor. To this end, a dielectric layer and an internal electrode have been designed to have a reduced thickness. However, as sizes of components have been decreased, it may be difficult to improve electrical and structural reliability.

SUMMARY

An aspect of the present disclosure is to provide a multilayer capacitor having reliability, such as withstand voltage characteristics and capacitance characteristics, improved by adjusting a grain size of a dielectric layer for each region.

According to an aspect of the present disclosure, a multilayer capacitor includes a body including a plurality of dielectric layers and a plurality of internal electrodes laminated in a first direction with respective dielectric layers interposed therebetween; and external electrodes formed on external surfaces of the body and connected to the internal electrodes. The body includes an active portion, in which the plurality of internal electrodes are disposed to form capacitance, corresponding to a region between internal electrodes disposed on an outermost side in the first direction, among the plurality of internal electrodes, a cover portion covering the active portion in the first direction, and a side margin portion covering the active portion in a second direction, perpendicular to the first direction, and $1.49<A1/A2<2.50$ where A1 is an average grain size of the dielectric layer in a central region of the active portion, and A2 is an average grain size of the dielectric layer in an active-cover boundary portion, adjacent to the cover portion, of the active portion.

A1 may be an average size of grains, present in an A1 rectangle of a cut surface of the body, and the A1 rectangle may have a horizontal length of $WA/3$ and a vertical length of $TA/3$, and may be symmetrical with respect to centerlines in the first direction and the second direction in the active portion, where TA is a length of the active portion in the first direction and WA is a length of the active portion in the second direction, based on the cut surface of the body, perpendicular to a third direction, perpendicular to the first and second directions.

A2 may be an average size of grains present in an A2 rectangle of the cut surface, and the A2 rectangle may have a horizontal length of $WA/3$ and a vertical length of $TA/6$, and may be symmetrical with respect to a centerline of the first direction in the active portion and may be in contact with an internal electrode disposed on an outermost side in the first direction, among the plurality of internal electrodes.

$C1<M1$, where C1 is an average grain size of the dielectric layer in a central region of the cover portion, and M1 is an average grain size in a central region of the side margin portion.

C1 may be an average size of grains present in a C1 rectangle of the cut surface, and the C1 rectangle may have a horizontal length of $WA/3$ and a vertical length of $TC/3$, and may be symmetrical with respect to centerlines in the first direction and the second direction in the cover portion, where TC is a length of the cover portion in the first direction, based on the cut surface of the body, perpendicular to a third direction, perpendicular to the first and second directions.

M1 may be an average size of grains present in an M1 rectangle of the cut surface, and the M1 rectangle may have a horizontal length of $WM/3$ and a vertical length of $TA/3$, and may be symmetrical with respect to centerlines in the first direction and the second direction in the side margin portion, where WM is a length of the side margin portion in the second direction.

$0.9<C2/M1<1.1$, where C2 is an average grain size of the dielectric layer in the cover-active boundary portion, adjacent to the active portion, of the cover portion.

C2 may be an average size of grains present in a C2 rectangle of the cut surface, and the C2 rectangle may have a horizontal length of $WA/3$ and a vertical length of $TC/6$, and may be symmetrical with respect to a centerline in the first direction in the cover portion, and may be in contact with an internal electrode disposed on an outermost side in the first direction, among the plurality of internal electrodes, where TC is a length of the cover portion in the first direction.

The dielectric layer may include a barium titanate component, and a molar ratio of barium (Ba) to titanium (Ti) of the dielectric layer in a central region of the active portion is smaller than a molar ratio of Ba to Ti of the dielectric layer in a central portion of the cover portion.

A molar ratio of Ba to Ti of the dielectric layer in a central region of the side margin portion may be smaller than the molar ratio of Ba to Ti of the dielectric layer in the central portion of the cover portion, and may be greater than the molar ratio of Ba to Ti of the dielectric layer in the central region of the active portion.

At least one of the plurality of dielectric layers may have an average thickness of less than 0.4 μm.

According to another aspect of the present disclosure, a multilayer capacitor includes: a body including a plurality of dielectric layers and a plurality of internal electrodes laminated in a first direction with respective dielectric layers interposed therebetween; and external electrodes formed on external surfaces of the body and connected to the internal electrodes. The body includes an active portion, in which the plurality of internal electrodes are disposed to form capacitance, corresponding to a region between internal electrodes disposed on an outermost side in the first direction, among the plurality of internal electrodes, a cover portion covering the active portion in the first direction, and a side margin portion covering the active portion in a second direction, perpendicular to the first direction, and $1.14 \leq A1/A3 < 1.50$ where A1 is an average grain size of the dielectric layer in a central region of the active portion, and A3 is an average grain size of the dielectric layer in an active-side boundary portion, adjacent to the side margin portion, of the active portion.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
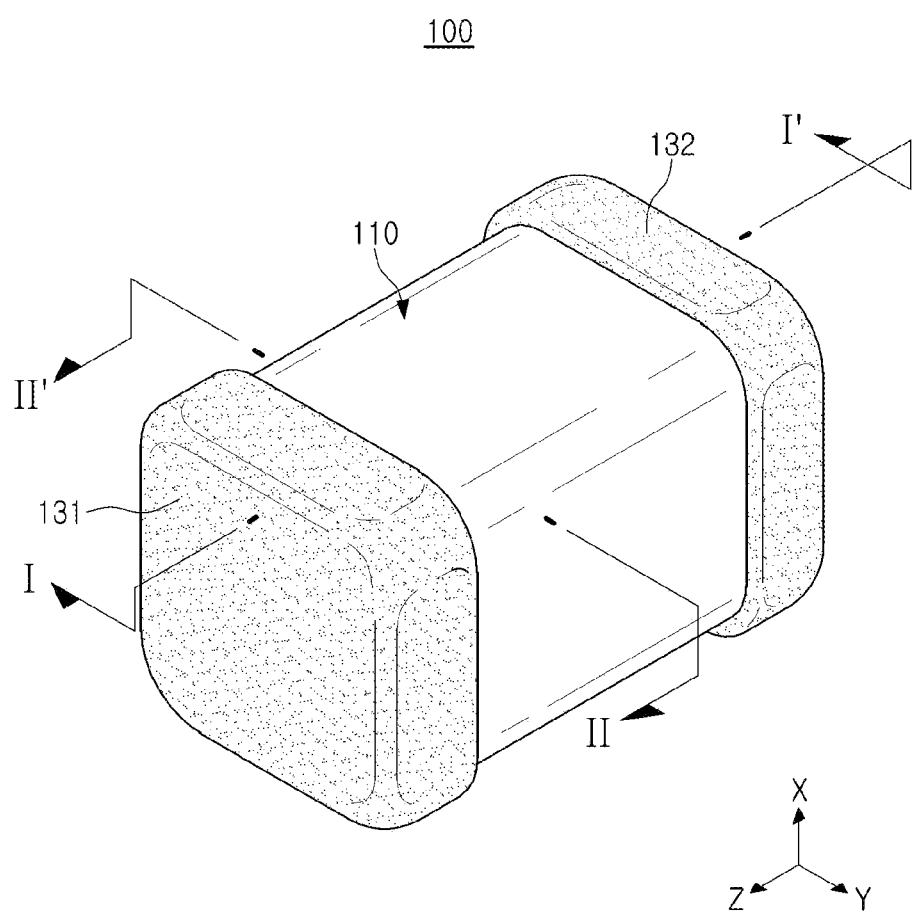
FIG. 1 is a schematic perspective view illustrating an exterior of a multilayer capacitor according to an exemplary embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings may be exaggerated for clear description. Also, elements having the same function within the scope of the same concept represented in the drawing of each example embodiment will be described using the same reference numeral.

In the drawings, same elements will be indicated by same reference numerals. Also, redundant descriptions and detailed descriptions of known functions and elements that may unnecessarily make the gist of the present invention obscure will be omitted. In the accompanying drawings, some elements may be exaggerated, omitted or briefly illustrated, and the sizes of the elements do not necessarily reflect the actual sizes of these elements. Also, it will be understood that when a portion "includes" an element, it may further include another element, not excluding another element, unless otherwise indicated.

Figure 2:
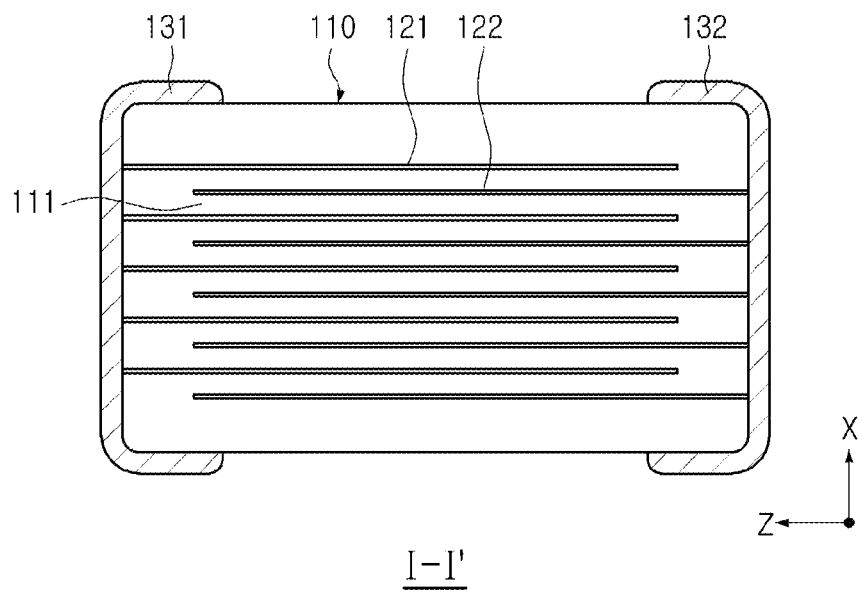
FIG. 2 is a cross-sectional view, taken along line I-I' of FIG. 1, illustrating the multilayer capacitor of FIG. 1.
Figure 3:
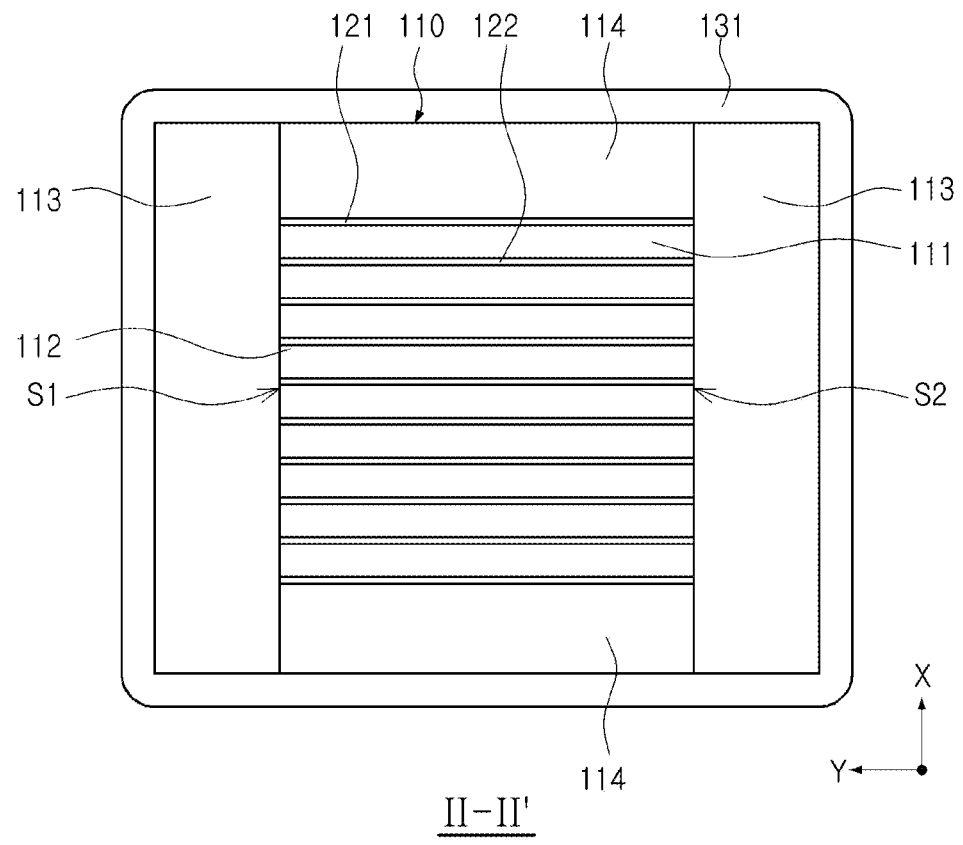
FIG. 3 is a cross-sectional view, taken along line II-II' of FIG. 1, illustrating the multilayer capacitor of FIG. 1.
Figure 4:
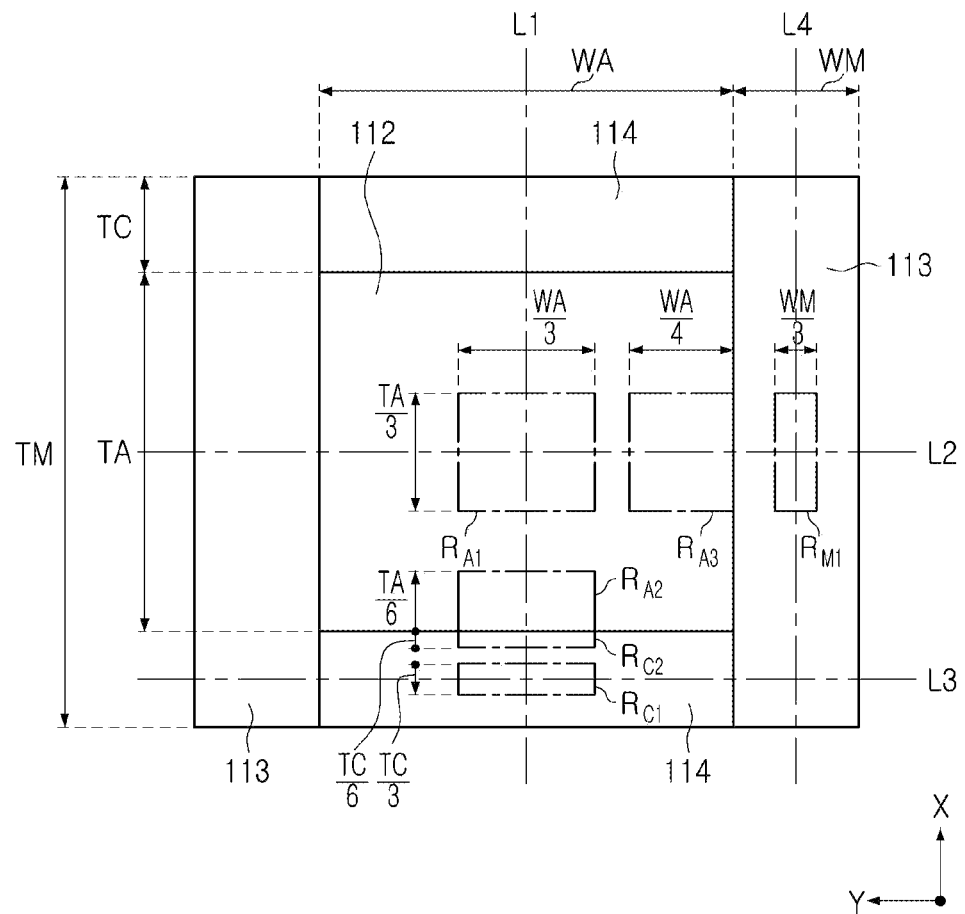
FIG. 4 illustrates a subdivision of a body region of FIG. 3.
Figure 5:
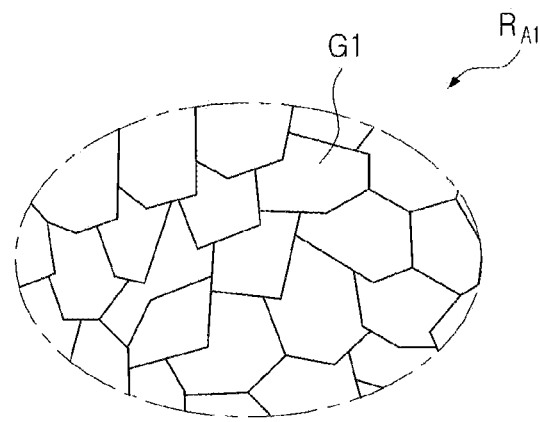
FIGS. 5 to 9 illustrate shapes of dielectric grains for each region of a body.
Figure 6:
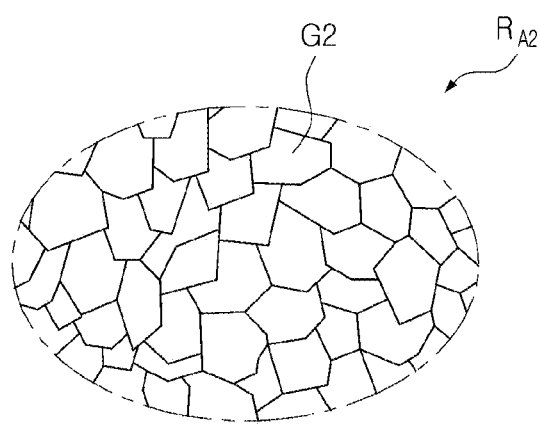
Figure 7:
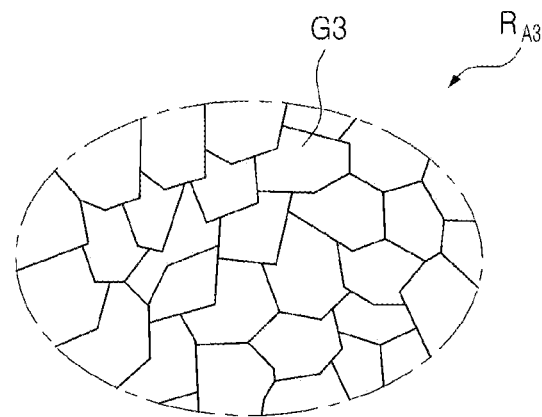
Figure 8:
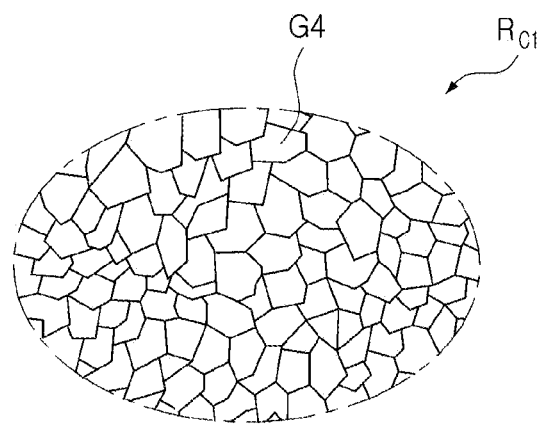

FIG. 1 is a schematic perspective view illustrating an exterior of a multilayer capacitor according to an exemplary embodiment of the present disclosure. FIG. 2 is a cross-sectional view, taken along line I-I' of FIG. 1, illustrating the multilayer capacitor of FIG. 1. FIG. 3 is a cross-sectional view, taken along line II-II' of FIG. 1, illustrating the multilayer capacitor of FIG. 1, and FIG. 4 illustrates a subdivision of a body region of FIG. 3. FIGS. 5 to 9 illustrate shapes of dielectric grains for each region of a body.

Referring to FIGS. 1 to 3, a multilayer capacitor 100 according to an exemplary embodiment may include a body 110, including a dielectric layer 111 and a plurality of internal electrodes 121 and 122 laminated in a first direction (an X direction) with the dielectric layer 111 interposed therebetween, and external electrodes 131 and 132. An average grain size of the dielectric layer 111 may be adjusted for each region of the body 110.

The body 110 may have a laminated structure in which a plurality of dielectric layers 111 are laminated in the first direction (the X direction), and may be obtained by, for example, laminating a plurality of green sheets and sintering the laminated green sheets. Due to such a sintering process, the plurality of dielectric layers 111 may have an integrated form. As illustrated in FIG. 1, the body 110 may have a shape similar to a rectangular parallelepiped. The dielectric layer 111, included in the body 110, may include a ceramic material having a high dielectric constant, such as BT-based ceramic, for example, barium titanate ($BaTiO_3$)-based ceramic, but other materials known in the art may be used as long as sufficient capacitance is able to be obtained therewith. As necessary, the dielectric layer 111 may further include additives, organic solvents, plasticizers, binders, and dispersants along with a ceramic material, a main component. The additive may include a metal component, and the additives may be added in the form of a metal oxide during a manufacturing process. As an example of the metal oxide additive, at least one of $MnO_2$, $Dy_2O_3$, BaO, MgO, $Al_2O_3$, $SiO_2$, $Cr_2O_3$ and $CaCO_3$ may be included.

The plurality of internal electrodes 121 and 122 may be obtained by printing a paste, containing a conductive metal, to a predetermined thickness on one surface of the ceramic green sheet and sintering the printed paste. As illustrated in FIG. 2, the plurality of internal electrodes 121 and 122 may include the internal electrodes 121 and 122 exposed to the first and second surfaces S1 and S2 of the body 110, opposing each other, in a third direction (a Z direction). When a direction in which a first surface S1 and a second surface S2 of an active portion 112 of the body 110 oppose each other is referred to as a second direction (a Y direction), the third direction (the Z direction) may be a direction perpendicular to the first direction (the X direction) and the second direction (the Y direction). The first and second internal electrodes 121 and 122 may be connected to different external electrodes 131 and 132 to have opposing polarities when driven, and the first and second internal electrodes 121 and 122 may be electrically separated from each other by the dielectric layer 111 disposed therebetween. The number of the external electrodes 131 and 132 or a method of connecting the external electrodes 131 and 132 to the internal electrodes 121 and 122 may vary according to exemplary embodiments. A main material of the internal electrodes 121 and 122 may be nickel (Ni), copper (Cu), palladium (Pd), silver (Ag), or alloys thereof.

The external electrodes 131 and 132 may be formed on external surfaces of the body 110 and may include first and second external electrodes 131 and 132, respectively connected to the first and second internal electrodes 121 and 122. In this case, the first and second external electrodes 131 and 132 may be disposed to oppose each other in the third direction (the Z direction). The external electrodes may be formed by preparing a material, including a conductive metal, as a paste and applying the prepared paste to the body 110. Examples of the conductive metal may include nickel (Ni), copper (Cu), Palladium (Pd), gold (Au), or alloys thereof. The external electrodes 131 and 132 may further include a plating layer including nickel (Ni), tin (Sn), or the like.

Referring to FIG. 3, in the case of the present embodiment, the body 110 may include an active portion 112, in which a plurality of internal electrodes 121 and 122 are disposed to form capacitance, corresponding to a region between internal electrodes disposed on an outermost side in a first direction (an X direction), among the plurality of internal electrodes 121 and 122, a cover portion 114 covering the active portion 112 in the first direction (the X direction), and a side margin portion 113 covering the active portion 112 in a second direction (a Y direction). The dielectric layer 111, included in the side margin portion 113 and the cover portion 114, may have characteristics (for example, a grain size, a Ba/Ti ratio, and the like) different from those of the dielectric layer 111 included in the active portion 112. This is designed by analyzing factors affecting withstand voltage characteristics, or the like, for each region of the body 110. For example, an average grain size of the dielectric layer 111 may vary for each region of the body 110, which is adjusted in consideration of characteristics such as a withstand voltage, high-temperature reliability, and the like.

The above will be described in more detail with reference to FIG. 4. In FIG. 4, the body is subdivided for each region and the internal electrodes are not illustrated. In the present embodiment, A1 and A2 satisfy a condition of $1.49<A1/A2<2.50$, where A1 is an average grain size of the dielectric layer 111 in a central region of the active portion 112, and A2 is an average grain size of the dielectric layer in an active-cover boundary portion, adjacent to the cover portion 114, of the active portion 112. As described above, in the body 110, the active portion 112 may be defined as a region between internal electrodes 121 and 122 disposed on an outermost side in the first direction (the X direction), and the cover portion 114 may be defined as a region from a region in contact with the internal electrodes 121 and 122, disposed on the outermost side, to a surface of the body 110.

When A1 and A2 satisfies the condition of $1.49<A1/A2<2.50$, capacitance may be sufficiently secured and withstand voltage characteristics may be improved. For this reason, a grain growth rate may vary in the active portion 112 and the active-cover boundary portion to secure sufficient capacitance in the active portion 112 and to improve the withstand voltage characteristics in the active-cover boundary portion through relatively refined and uniform grains. As can be seen from experimental results to be described later, capacitance or withstand voltage reliability may be improved in the case in which A1/A2 is 1.49 or less, as compared with the case in which A1/A2 is greater than 1.49. However, when A1/A2 is increased to be 2.50 or more and thus a grain size deviation is significantly increased for each region, capacitance characteristic, and the like, may be deteriorated.

Apart from the condition of $1.49<A1/A2<2.50$, A3 satisfies a condition of $1.14\leq A1/A3<1.50$, where A3 is an average grain size of the dielectric layer 111 in an active-side boundary portion, adjacent to the side margin portion 113, of the active portion 112. As can be seen from experimental results to be described later, the capacitance or the withstand voltage reliability may be improved in the case in which A1/A3 is 1.14 or greater, as compared with the case in which A1/A3 is less than 1.14. However, when A1/A3 is increased to be 1.50 or more and thus a grain size deviation is significantly increased for each region, the capacitance characteristics, and the like, may be deteriorated. As described above, in the present embodiment, grains of the dielectric layer 111 may be sufficiently grown in the central region of the active portion 112 such that the average grain size is relatively large, and thus, the capacitance characteristics may be improved. Meanwhile, in the side margin portion 113 and the cover portion 114, grain growth may be relatively inhibited such that a grain size may be small. In this case, A1, A2, and A3 may satisfy both the conditions of $1.49<A1/A2<2.50$ and the condition of $1.14<A1/A3<1.50$.

Referring to FIGS. 5 to 9 together with FIG. 4, as an example of methods of measuring a grain size, an average grain size of the dielectric layer 111 may be measured based on a cut surface formed by cutting the body 110 in the first direction (the X direction) and the second direction (the Y direction), for example, a cut surface of the body 110, perpendicular to the third direction (the Z direction). In this case, a cut surface formed by cutting a center of the body 110 may be used in the third direction (the Z direction). An average grain size may be obtained using an image formed by capturing the cut surface with an electron microscope such as, for example, a scanning electron microscope (SEM) or a transmission electron microscope (TEM).

A1, the average grain size of the dielectric layer 111 in the central region of the active portion 112, may be an average grain size of grains G1 present in an A1 rectangle RA1 of the cut surface. In this case, the A1 rectangle RA1 may have a horizontal length of WA/3 and a vertical length of TA/3 (where TA is a length of the active portion 112 in the first direction (the X direction), and WA is a length of the active portion 112 in the second direction (the Y direction), and may be symmetrical with respect to centerlines L1 and L2 in the first direction (the X direction) and the second direction (the Y direction) in the active portion 112. A2, the average grain size of the dielectric layer 111 in the active-cover boundary portion, adjacent to the cover portion 114, of the active portion 112, may be an average size of grains G2 present in an A2 rectangle RA2 of the cut surface. The A2 rectangle may have a horizontal length of WA/3 and a vertical length of TA/6, and may be symmetrical with respect to the centerline L1 in the first direction (the X direction) in the active portion 112 and may be in contact with an internal electrode, disposed an outermost side in the first direction (the X direction), among the plurality of internal electrodes 121 and 122. A3 may be an average size of grains G3 present in an A3 rectangle RA3 of the cut surface. The A3 rectangle RA3 may have a horizontal length WA/4 and a vertical direction of TA/3, and may be symmetrical with respect to the centerline L2 in the active portion 112 and may be in contact with the side margin portion 113. When the sizes of the grains G1, G2 and G3 are measured, a method of measuring areas of the grains G1, G2, and G3 and converting the measured area into circle equivalent diameters, a method of measuring a major-axis length and a minor-axis length to calculate an average thereof, and the like, may be used. In addition, only the grains G1, G2, and G3, in which the entire region of the reference rectangles RA1, RA2, and RA3 is surrounded by grain boundaries, may be selected to increase accuracy of the measurement. Such a measuring method may be applied to other grains G4 and G6.

The present inventors found that characteristics relating to reliability criteria of a multilayer capacitor, such as withstand voltage characteristics, or the like, may be improved when satisfying at least one of the above-described average grain size conditions for each region of the dielectric layer 111, for example, the condition of 1.49<A1/A2<2.5 and the condition of 1.14≤A1/A3<1.50. In addition, the present inventors confirmed that a grain size relationship in the central region of the active portion 112, the active-cover boundary portion, and the active-side boundary portion is an important parameter affecting the above characteristics. This will be described later in more detail.

As a more detailed grain size condition, C1 and M1 may satisfy a condition of C1<M1, where C1 is an average grain size of the dielectric layer 111 in a central region of the cover portion 114, and M1 is an average grain size of the dielectric layer 111 in a central region of the side margin portion 113. For example, the present embodiment employs a structure in which the average grain size of the dielectric layer 111 is smaller in the central region of the cover portion 114 than in the central region of the side margin portion 113. Thus, moisture resistance reliability of the cover portion 114 may be further improved. In this case, C2 may satisfy a condition of 0.9<C2/M1<1.1, where C2 is an average grain size of the dielectric layer 111 in a cover-active boundary portion, adjacent to the active portion 112, of the cover portion 114. This means that a microstructure of the dielectric layer 111 is overall uniform in the central region of the side margin portion 113 and the cover-active boundary portion, adjacent to the active portion 112, of the cover portion 114.

Figure 9:
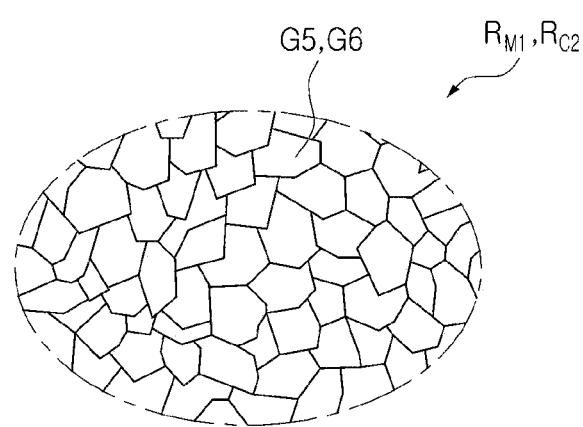

As examples of measurement criteria of C1, C2, and M1, C1 may be an average size of grains G4 present in a C1 rectangle RC1 of the cut surface. The C1 rectangle RC1 may have a horizontal length of WA/3 and a vertical length of TC/3, where TC is a length of the cover portion 114 in the first direction (the X direction), and may be symmetrical with respect to centerlines L1 and L3 in the first direction and the second direction in the cover portion 114. In addition, M1 may be an average size of grains G5 present in an M1 rectangle RM1 of the cut surface. The M1 rectangle RM1 may have a horizontal length of WM/3 and a vertical length of TA/3, where WM is a length of the side margin portion 113 in the second direction (the Y direction), and may be symmetrical with respect to centerlines L1 and L4 in the first direction and the second direction in the side margin portion 113. In addition, C2 may be an average size of grains G6 present in a C2 rectangle RC2 of the cut surface. The C2 rectangle RC2 may have a horizontal length of WA/3 and a vertical length of TC/6, and may be symmetrical with respect to the centerline L1 in the first direction in the cover portion 114 and may be in contact with an internal electrode disposed on an outermost side in the first direction (the X direction), among the plurality of internal electrodes 121 and 122. In this case, M1 and C2 may have similar levels, and grains present in the M1 rectangle RM1 may have a size similar to a size of the grains G6 present in the C2 rectangle RC2. However, M1 and C2 have similar levels and do not need to have the same level. In addition, as illustrated in FIGS. 9, G5 and G6 do not need to have the same shape.

To implement the above-described dielectric grain size condition, the following method may be used as an example. For example, when a ceramic green sheet is prepared by mixing ceramic powder, a binder, and a solvent to form the body 110, a method of adjusting a ceramic particle size distribution, a content of the binder, a Ba/Ti value (for example, a molar ratio of Ba to Ti), and the like, in the active portion 112, the side margin portion 113, and the cover portion 114 may be used. When a content ratio of the binder is lower in a sheet for forming the side margin portion 113 and the cover portion 114 than in a sheet for forming the active portion 112, or when a Ba/Ti value is greater in a sheet for forming the side margin portion 113 and the cover portion 114 than in a sheet for forming the active portion 112, the sheet for forming the side margin portion 113 and the cover portion 114 is contracted first. In this case, a contraction rate of the side margin portion 113 and the cover portion 114 may be higher than a boundary portion in a central region. In contrast, a contraction rate of the active portion 112 may be higher in a central region than in a boundary portion. Accordingly, a grain size may be relatively small in the dielectric layer 111 of the side margin portion 113 and the cover portion 114. Since the binder is rarely detected in the active portion 112, the side margin portion 113, and the cover portion 114 after a sintering process, a content of the binder cannot be compared but Ba/Ti value conditions may be the same as those in the manufacturing process. For example, a molar ratio of Ba to Ti of the dielectric layer 111 in the central region of the active portion 112 may be smaller than a molar ratio of Ba to Ti of the dielectric layer 111 in the central region of the cover portion 114. In addition, a molar ratio of Ba to Ti of the dielectric layer 111 in the central region of the side margin portion 113 may smaller than the molar ratio of Ba to Ti of the dielectric layer 111 in the central region of the cover portion 114, and may be greater than the molar ratio of Ba to Ti of the dielectric layer 111 in the central region of the active portion 112.

The ceramic particle size distribution may also have an effect on the grain size of the dielectric layer 111 in the active portion 112, the side margin portion 113, and the cover portion 114 after a sintering process. However, according to the research of the present inventors, the ceramic particle size distribution had less effect than the content of the binder or the Ba/Ti value. Therefore, ceramic particles having a smaller particle size than the sheet for forming the active portion 112 do not need to be used in the sheet for forming the side margin portion 113 or the cover portion 114 to obtain the above-described grain size conditions of the present embodiment.

In addition, in the present embodiment, at least one of the plurality of dielectric layers 111 may have an average thickness of less than 0.4 µm. The thickness of the dielectric layer 111 may be measured through an image of the cut surface, and the average thickness of the dielectric layer 111 may be obtained by calculating an average value of thicknesses measured at a plurality of points (for example, ten points) arranged at regular intervals. When the dielectric layer 111 is implemented as a thin film having a thickness of less than 0.4 µm, it may be appropriate to reduce a size of the multilayer capacitor 100 and to improve capacitance, but there is a possibility that withstand voltage characteristics of the dielectric layer 111 may be deteriorated. However, when the above-described grain size condition proposed in the present embodiment is satisfied, the grain size may be adjusted for each region to secure improved withstand voltage characteristics.

The present inventors produced samples having average grain sizes different from each other in an active portion, a side margin portion, and a cover portion, measured an average grain size and a ratio thereof in each of the portions, and performed a capacitance test and a breakdown voltage (BV) test on each of the samples. Test results are listed in Table 1, and the unit of grain size is nanometer (nm). Among the samples, Samples 1 and 2 correspond to examples of the present disclosure, and Samples 3 to 11 correspond to comparative examples in which neither of the A1/A2 and A1/A3 conditions are satisfied.

TABLE 1

| SMP | A1 | A2 | A3 | M1 | C2 | A1/A2 | A1/A3 | C2/M1 | C(μF) | BV(V) |
|---|---|---|---|---|---|---|---|---|---|---|
| 1 | 343.62 | 225.4 | 300.5 | 196.8 | 205.6 | 1.52 | 1.14 | 1.04 | 4.87 | 68 |
| 2 | 311.06 | 191.1 | 256.9 | 172.1 | 183.9 | 1.63 | 1.21 | 1.07 | 4.72 | 65 |
| 3* | 251.87 | 204.6 | 241.2 | 198.3 | 222.0 | 1.23 | 1.04 | 1.12 | 4.02 | 65 |
| 4* | 251.17 | 194.9 | 227.6 | 213.0 | 209.6 | 1.29 | 1.10 | 0.98 | 4.15 | 63 |
| 5* | 329.51 | 257.8 | 301.9 | 244.1 | 208.8 | 1.28 | 1.09 | 0.86 | 4.5 | 59 |
| 6* | 326.55 | 261.0 | 321.4 | 248.5 | 240.0 | 1.25 | 1.02 | 0.97 | 4.7 | 59 |
| 7* | 343.48 | 282.9 | 334.0 | 258.2 | 235.9 | 1.21 | 1.03 | 0.91 | 4.47 | 58 |
| 8* | 379.78 | 255.9 | 340.5 | 201.2 | 212.0 | 1.48 | 1.12 | 1.05 | 4.36 | 55 |
| 9* | 355.02 | 255.1 | 322.2 | 191.1 | 200.4 | 1.39 | 1.10 | 1.05 | 4.54 | 54 |
| 10* | 328.36 | 220.7 | 302.6 | 175.1 | 187.9 | 1.49 | 1.09 | 1.07 | 4.68 | 53 |
| 11* | 338.10 | 116.2 | 339.8 | 225.1 | 102.2 | 2.91 | 0.99 | 0.45 | 2.19 | 62 |

SMP: Sample Number
C(μF): Capacitance (μF)
*Comparative Example

According to the above test results, when a condition of $1.49 < A1/A2 < 2.50$ was satisfied, capacitance was high at a level of more than 4.7 μF, and withstand voltage characteristics were relatively improved. In addition, even when a condition of $1.14 \leq A1/A3 < 1.50$ was satisfied, capacitance and withstand voltage characteristics were also improved. This may be because sufficient grain growth of a dielectric layer occurred in an active portion to secure sufficient capacitance, while the dielectric layer had a relatively dense structure having a uniform grain size to improve reliability. In addition to the conditions, when a condition of $0.9 < C2/M1 < 1.1$ was satisfied and thus a difference between a grain size in a cover-active boundary portion and a grain size in a side margin is not great, it was advantageous in terms of capacitance and withstand voltage characteristics. Although a result value for C1 was not presented, the condition of $C1 < M1$ was satisfied in an exemplary embodiment. This means that an average grain size of the dielectric layer was larger in a central region of the side margin portion than in a central region of the cover portion.

As described above, in the case of a multilayer capacitor according to an exemplary embodiment, withstand voltage characteristics, capacitance characteristics, and the like, may be improved.

While exemplary embodiments have been shown and described above, it will be apparent to those skilled in the art that modifications and variations could be made without departing from the scope of the present disclosure as defined by the appended claims.

What is claimed is:

1. A multilayer capacitor comprising:
a body including a plurality of dielectric layers and a plurality of internal electrodes laminated in a first direction with respective dielectric layers interposed therebetween; and
external electrodes formed on external surfaces of the body and connected to the internal electrodes,
wherein the body includes an active portion, in which the plurality of internal electrodes are disposed to form capacitance, corresponding to a region between internal electrodes disposed on an outermost side in the first direction, among the plurality of internal electrodes, a cover portion covering the active portion in the first direction, and a side margin portion covering the active portion in a second direction, perpendicular to the first direction, and
wherein $1.49 < A1/A2 < 2.50$,
where A1 is an average grain size in a dielectric layer in the central region of the active portion, and A2 is an average grain size in a dielectric layer in an active-cover boundary portion, adjacent to the cover portion, of the active portion,
wherein $0.9 < C2/M1 < 1.1$,
where M1 is an average grain size in the central region of the side margin portion, and C2 is an average grain size in a dielectric layer in the cover-active boundary portion, adjacent to the active portion, of the cover portion.

2. The multilayer capacitor of claim 1, wherein A1 is an average size of grains present in an A1 rectangle of a cut surface of the body, and the A1 rectangle has a horizontal length of WA/3 and a vertical length of TA/3 and is symmetrical with respect to centerlines in the first direction and the second direction in the active portion,
where TA is a length of the active portion in the first direction and WA is a length of the active portion in the second direction, based on the cut surface of the body, perpendicular to a third direction, perpendicular to the first and second directions.

3. The multilayer capacitor of claim 2, wherein A2 is an average size of grains present in an A2 rectangle of the cut surface, and the A2 rectangle has a horizontal length of WA/3 and a vertical length of TA/6, is symmetrical with respect to a centerline of the first direction in the active portion, and is in contact with an internal electrode disposed on an outermost side in the first direction, among the plurality of internal electrodes.

4. The multilayer capacitor of claim 1, wherein where C1 is an average grain size in a dielectric layer in the central region of the cover portion, C1 is an average size of grains present in a C1 rectangle of the cut surface, and the C1 rectangle has a horizontal length of WA/3 and a vertical length of TC/3 and is symmetrical with respect to centerlines in the first direction and the second direction in the cover portion,
where TC is a length of the cover portion in the first direction, based on the cut surface of the body, perpendicular to a third direction, perpendicular to the first and second directions.

5. The multilayer capacitor of claim 1, wherein M1 is an average size of grains present in an M1 rectangle of the cut surface, and the M1 rectangle has a horizontal length of WM/3 and a vertical length of TA/3 and is symmetrical with respect to centerlines in the first direction and the second direction in the side margin portion, where WM is a length of the side margin portion in the second direction.

6. The multilayer capacitor of claim 1, wherein C2 is an average size of grains present in a C2 rectangle of the cut surface, and the C2 rectangle has a horizontal length of WA/3 and a vertical length of TC/6, is symmetrical with respect to a centerline in the first direction in the cover portion, and is in contact with an internal electrode disposed on an outermost side in the first direction, among the plurality of internal electrodes, where TC is a length of the cover portion in the first direction.

7. The multilayer capacitor of claim 1, wherein at least one of the plurality of dielectric layers has an average thickness of less than 0.4 μm.

8. A multilayer capacitor comprising:
a body including a plurality of dielectric layers and a plurality of internal electrodes laminated in a first direction with respective dielectric layers interposed therebetween; and
external electrodes formed on external surfaces of the body and connected to the internal electrodes,
wherein the body includes an active portion, in which the plurality of internal electrodes are disposed to form capacitance, corresponding to a region between internal electrodes disposed on an outermost side in the first direction, among the plurality of internal electrodes, a cover portion covering the active portion in the first direction, and a side margin portion covering the active portion in a second direction, perpendicular to the first direction, and
wherein 1.49<A1/A2<2.50,
where A1 is an average grain size in a dielectric layer in the central region of the active portion, and A2 is an average grain size in a dielectric layer in an active-cover boundary portion, adjacent to the cover portion, of the active portion, wherein the plurality of dielectric layers includes a barium titanate component, and
a dielectric composition of the central region of the active portion is different from that of the central region of the cover portion, and
wherein a molar ratio of Ba to Ti in a central region of the cover portion is different from the molar ratio of Ba to Ti in the central region of the active portion.

9. The multilayer capacitor of claim 8, wherein A1 is an average size of grains present in an A1 rectangle of a cut surface of the body, and the A1 rectangle has a horizontal length of WA/3 and a vertical length of TA/3 and is symmetrical with respect to centerlines in the first direction and the second direction in the active portion, where TA is a length of the active portion in the first direction and WA is a length of the active portion in the second direction, based on the cut surface of the body, perpendicular to a third direction, perpendicular to the first and second directions.

10. The multilayer capacitor of claim 9, wherein A2 is an average size of grains present in an A2 rectangle of the cut surface, and the A2 rectangle has a horizontal length of WA/3 and a vertical length of TA/6, is symmetrical with respect to a centerline of the first direction in the active portion, and is in contact with an internal electrode disposed on an outermost side in the first direction, among the plurality of internal electrodes.

11. The multilayer capacitor of claim 8,
wherein 0.9<C2/M1<1.1,
where C2 is an average grain size in a dielectric layer in the cover-active boundary portion, adjacent to the active portion, of the cover portion, and M1 is an average grain size in a dielectric layer in the central region of the side margin portion.

12. The multilayer capacitor of claim 11, wherein C2 is an average size of grains present in a C2 rectangle of the cut surface, and the C2 rectangle has a horizontal length of WA/3 and a vertical length of TC/6, is symmetrical with respect to a centerline in the first direction in the cover portion, and is in contact with an internal electrode disposed on an outermost side in the first direction, among the plurality of internal electrodes, where TC is a length of the cover portion in the first direction.

13. The multilayer capacitor of claim 8, wherein C1<M1,
where C1 is an average grain size in a dielectric layer in the central region of the cover portion, and M1 is an average grain size in a dielectric layer in the central region of the side margin portion.

14. The multilayer capacitor of claim 13, wherein M1 is an average size of grains present in an M1 rectangle of the cut surface, and the M1 rectangle has a horizontal length of WM/3 and a vertical length of TA/3 and is symmetrical with respect to centerlines in the first direction and the second direction in the side margin portion, where WM is a length of the side margin portion in the second direction.

15. The multilayer capacitor of claim 13, wherein C1 is an average size of grains present in a C1 rectangle of the cut surface, and the C1 rectangle has a horizontal length of WA/3 and a vertical length of TC/3 and is symmetrical with respect to centerlines in the first direction and the second direction in the cover portion, where TC is a length of the cover portion in the first direction, based on the cut surface of the body, perpendicular to a third direction, perpendicular to the first and second directions.

16. The multilayer capacitor of claim 8, wherein a molar ratio of Ba to Ti in a central region of the side margin portion is smaller than the molar ratio of Ba to Ti in the central region of the cover portion, and is greater than the molar ratio of Ba to Ti in the central region of the active portion.

17. The multilayer capacitor of claim 8, wherein the dielectric composition of the central region of the active portion is different from that of the central region of the side margin portion.

18. The multilayer capacitor of claim 8, wherein the dielectric composition of the central cover portion is different from that of the central region of the side margin portion.

19. The multilayer capacitor of claim 8, wherein at least one of the plurality of dielectric layers has an average thickness of less than 0.4 μm.

* * * * *